United States Patent
Jaber

(10) Patent No.: US 9,506,717 B2
(45) Date of Patent: Nov. 29, 2016

(54) MULTIPLE SHOT SPEAR GUN

(71) Applicant: KING ABDULAZIZ UNIVERSITY, Jeddah (SA)

(72) Inventor: Hassan Mohammed H. Jaber, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 18 days.

(21) Appl. No.: 14/587,383

(22) Filed: Dec. 31, 2014

(65) Prior Publication Data
US 2016/0187097 A1    Jun. 30, 2016

(51) Int. Cl.
| F41B 7/04 | (2006.01) |
| F41C 9/06 | (2006.01) |
| A01K 81/00 | (2006.01) |
| F41F 1/10 | (2006.01) |
| F41B 11/83 | (2013.01) |

(52) U.S. Cl.
CPC ............... *F41B 7/04* (2013.01); *A01K 81/00* (2013.01); *F41B 11/83* (2013.01); *F41C 9/06* (2013.01); *F41F 1/10* (2013.01)

(58) Field of Classification Search
CPC .......... F41B 7/04; F41B 11/83; F41B 7/046; F41C 9/06; A01K 81/00
USPC ........ 124/20.3, 22, 31, 40, 48; 42/1.14; 43/6
See application file for complete search history.

(56) References Cited

U.S. PATENT DOCUMENTS

| 2,837,078 | A | * | 6/1958 | Daniel | F41B 7/04 |
| | | | | | 124/27 |
| 3,397,476 | A | * | 8/1968 | Weber | F41B 11/83 |
| | | | | | 124/48 |
| 3,453,763 | A | * | 7/1969 | Barr | F41C 9/06 |
| | | | | | 102/522 |
| 3,494,060 | A | * | 2/1970 | Hendricks | A01K 81/00 |
| | | | | | 42/1.14 |
| 3,545,117 | A | * | 12/1970 | Van Voorhees | A01K 81/00 |
| | | | | | 42/1.14 |
| 3,585,979 | A | * | 6/1971 | Hendricks | F41B 7/04 |
| | | | | | 124/22 |
| 3,616,561 | A | * | 11/1971 | Hendricks | F41F 1/10 |
| | | | | | 42/1.14 |
| 3,721,031 | A | * | 3/1973 | Falterman | F41C 9/06 |
| | | | | | 42/1.14 |
| 3,729,853 | A | * | 5/1973 | Critcher | F41C 9/06 |
| | | | | | 124/48 |
| 3,741,190 | A | * | 6/1973 | Lopez | A01K 81/00 |
| | | | | | 124/22 |
| 3,773,026 | A | * | 11/1973 | Romero | F41B 7/04 |
| | | | | | 124/22 |
| 4,019,480 | A | * | 4/1977 | Kenaio | F41B 11/83 |
| | | | | | 124/31 |
| 4,122,621 | A | * | 10/1978 | Barr | F41A 9/73 |
| | | | | | 42/1.14 |
| 4,759,336 | A | * | 7/1988 | Frain | F41A 17/22 |
| | | | | | 124/22 |
| 4,821,441 | A | * | 4/1989 | Castro, Jr. | F41C 9/06 |
| | | | | | 42/1.14 |

(Continued)

*Primary Examiner* — Alexander Niconovich
(74) *Attorney, Agent, or Firm* — Richard C. Litman

(57) ABSTRACT

The multiple shot spear gun includes a central rotary shaft having a plurality of relatively stationary spear launching tubes or barrels distributed therearound in a cylindrical pattern. The number of spear launching tubes or barrels is not limited, but may comprise any practicable number. Rotation of the central shaft causes a disc to rotate. The disc has a ramp or tang thereon that sequentially engages the trigger of each of the spear launchers as the disc is rotated. A safety disc is rotated with rotation of the central shaft. The safety disc includes a plurality of holes therein. A spring-loaded catch engages one of the holes as the disc rotates with rotation of the central shaft. Thus, the operator of the multiple shot spear gun must release the safety catch after each shot to rotate the central shaft further for the next shot.

20 Claims, 5 Drawing Sheets

(56) References Cited

U.S. PATENT DOCUMENTS

| | | | | |
|---|---|---|---|---|
| 4,962,747 A * | 10/1990 | Biller | | A01K 81/00 124/22 |
| 5,372,118 A * | 12/1994 | Schmidt, III | | A01K 81/00 124/20.3 |
| 5,595,166 A * | 1/1997 | Schmidt, III | | A01K 81/00 124/20.3 |
| 6,708,683 B1 * | 3/2004 | Harris | | A01K 81/00 124/20.3 |
| 6,953,034 B2 * | 10/2005 | May | | A01K 81/00 124/17 |
| 2009/0235911 A1 * | 9/2009 | Klarborg | | F41B 11/646 124/66 |
| 2011/0315134 A1 * | 12/2011 | Tsai | | F41B 11/643 124/56 |

* cited by examiner

MULTIPLE SHOT SPEAR GUN

BACKGROUND OF THE INVENTION

1. Field of the Invention

The present invention relates generally to weaponry, and particularly to a multiple shot spear gun enabling the user to fire several shots without reloading the gun.

2. Description of the Related Art

Spear guns have been known and used in professional and recreational diving for a considerable period of time. The use of a pneumatically or mechanically propelled spear is much more efficient for underwater use than a conventional firearm, which would be unworkable in the underwater environment.

However, conventional spear guns provide only a single shot before reloading is required. Obviously, this greatly limits the options of the diver using the gun. The use of such a single-shot spear gun will often result in the diver completely missing a game fish or other target due to the time it takes to reload after a first missed shot, when the fish escapes after being alerted by the missed shot. In some instances where the diver must use the spear gun as a defensive weapon, the diver may be placed in great danger if the single shot misses the aggressor and the diver is unable to reload the gun quickly.

Thus, a multiple shot spear gun solving the aforementioned problems is desired.

SUMMARY OF THE INVENTION

The multiple shot spear gun includes a central rotary shaft having a plurality of relatively stationary spear launching tubes or barrels distributed therearound in a generally cylindrical pattern. The number of spear launching tubes or barrels is not specifically limited, but may comprise any practicable number arranged as described above. Rotation of the central shaft causes a disc to rotate. The disc has a ramp or tang thereon that sequentially engages the trigger of each of the spear launchers as the disc is rotated. A safety disc is rotated with rotation of the central shaft. The safety disc includes a plurality of holes therein. A spring-loaded catch engages one of the holes as the disc rotates due to rotation of the central shaft. Thus, the operator of the multiple shot spear gun must release the safety catch after each shot to rotate the central shaft further for the next shot.

These and other features of the present invention will become readily apparent upon further review of the following specification and drawings.

DETAILED DESCRIPTION OF THE PREFERRED EMBODIMENTS

Figure 1:
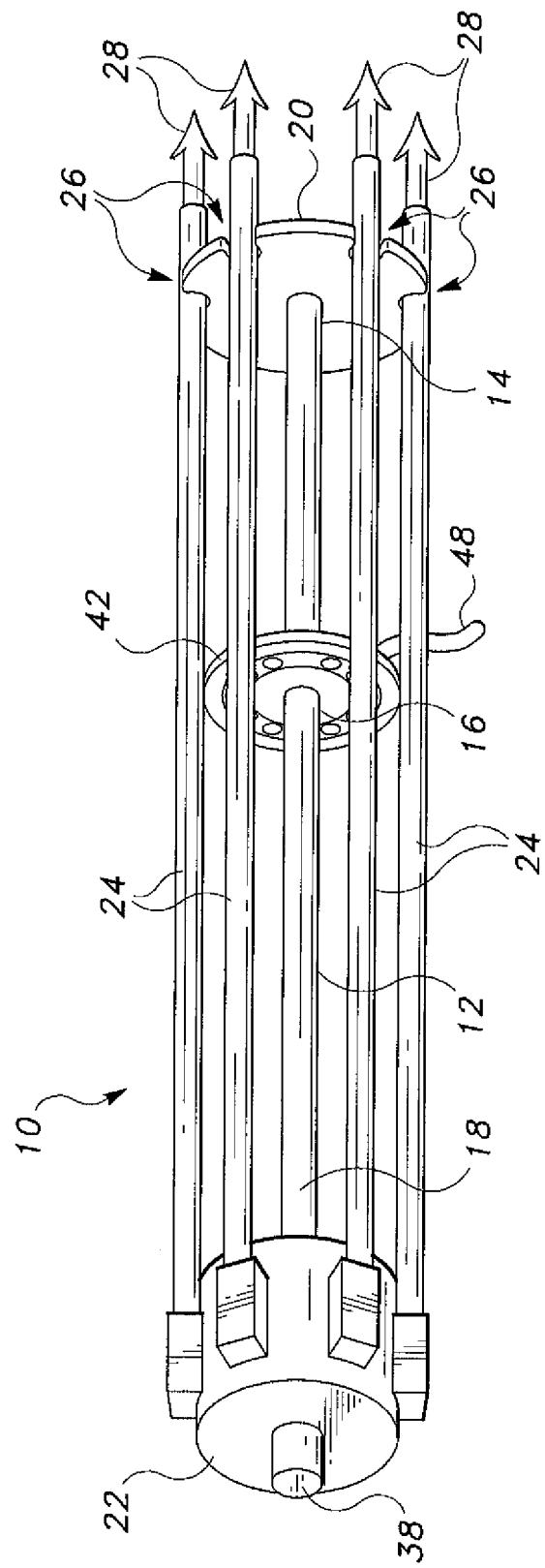
FIG. 1 is a perspective view of a multiple shot spear gun according to the present invention, illustrating its general configuration and features.
Figure 2:
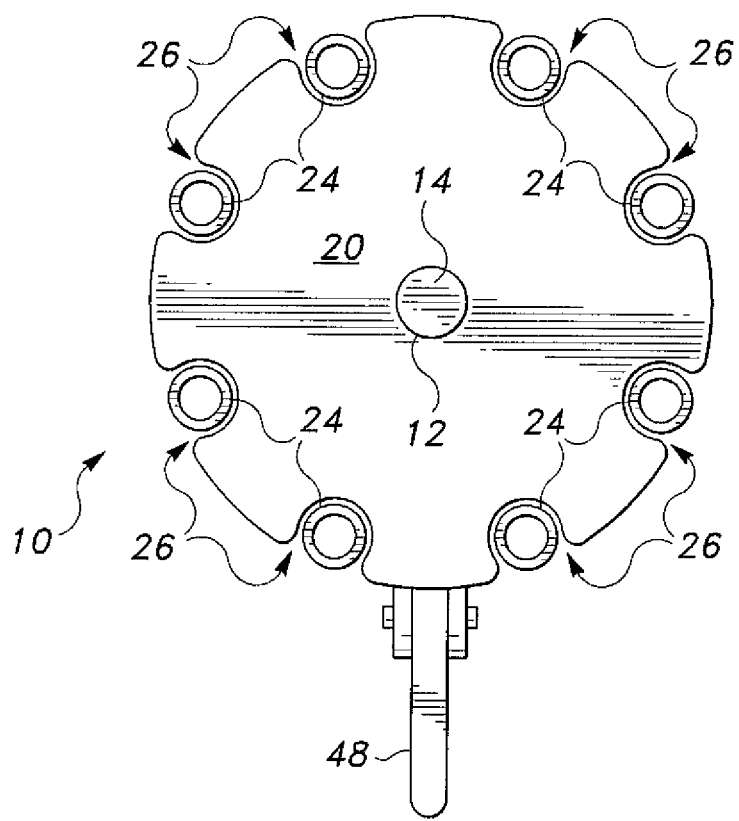
FIG. 2 is a front elevation view of the multiple shot spear gun of FIG. 1, illustrating further details thereof.

The multiple shot spear gun provides a diver or other user with a plurality of spear shots from a single spear gun, without the need to reload the gun after each shot. FIG. 1 provides a perspective view of the multiple shot spear gun (or spear gun) 10, illustrating its general features. FIG. 2 provides a front elevation view of the spear gun 10. The spear gun 10 includes an elongate central rotary shaft 12 having a forward end 14, a medial portion 16, and a rearward end 18. The forward end 14 of the shaft 12 has a barrel retainer disc 20 thereon, which remains stationary relative to the rotary shaft, i.e., the forward end 14 of the shaft 12 rotates within the disc 20.

Figure 3:
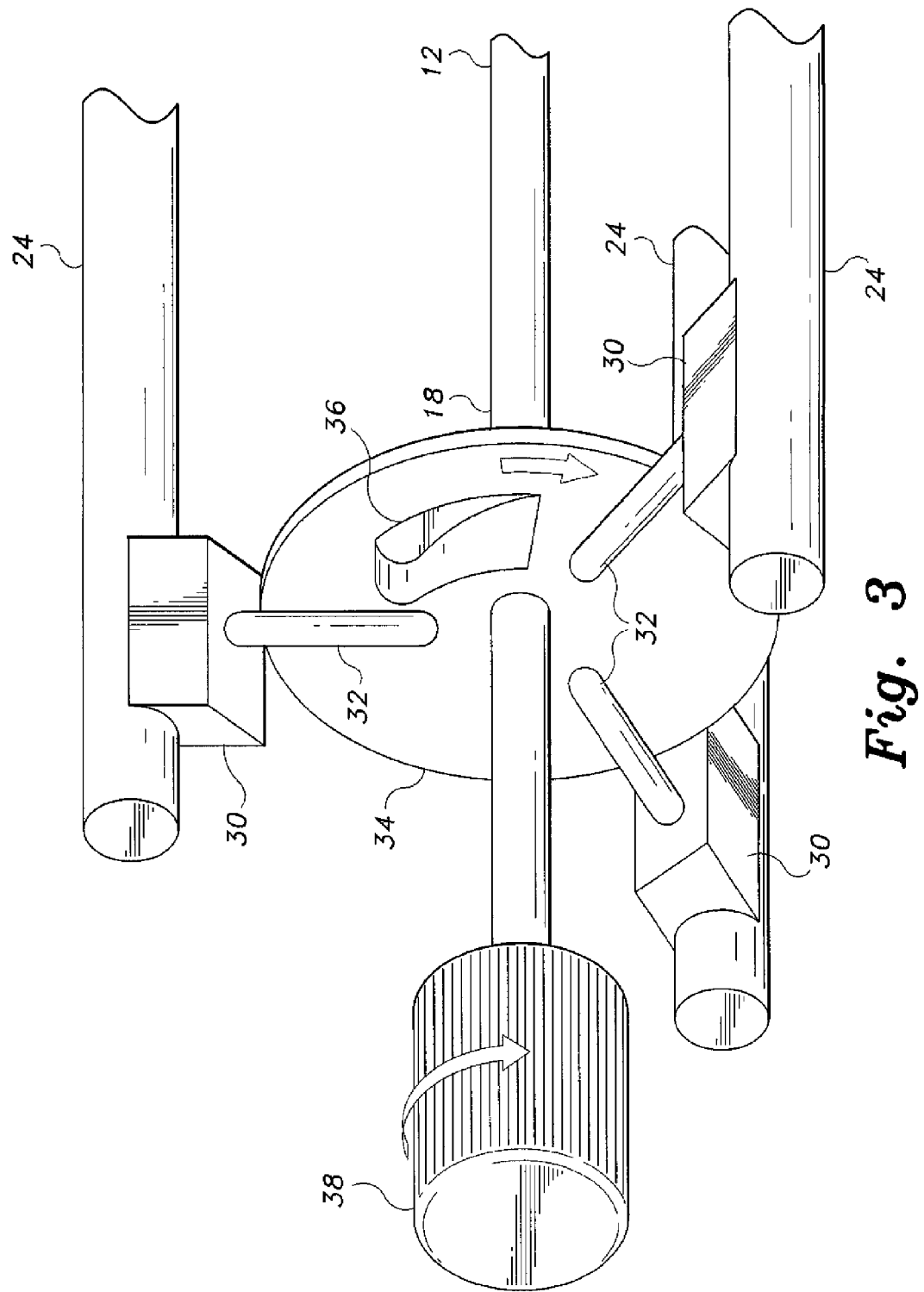
FIG. 3 is a detailed partial perspective view of a first embodiment of a rotary firing mechanism of the multiple shot spear gun according to the present invention, illustrating further details thereof.
Figure 5:
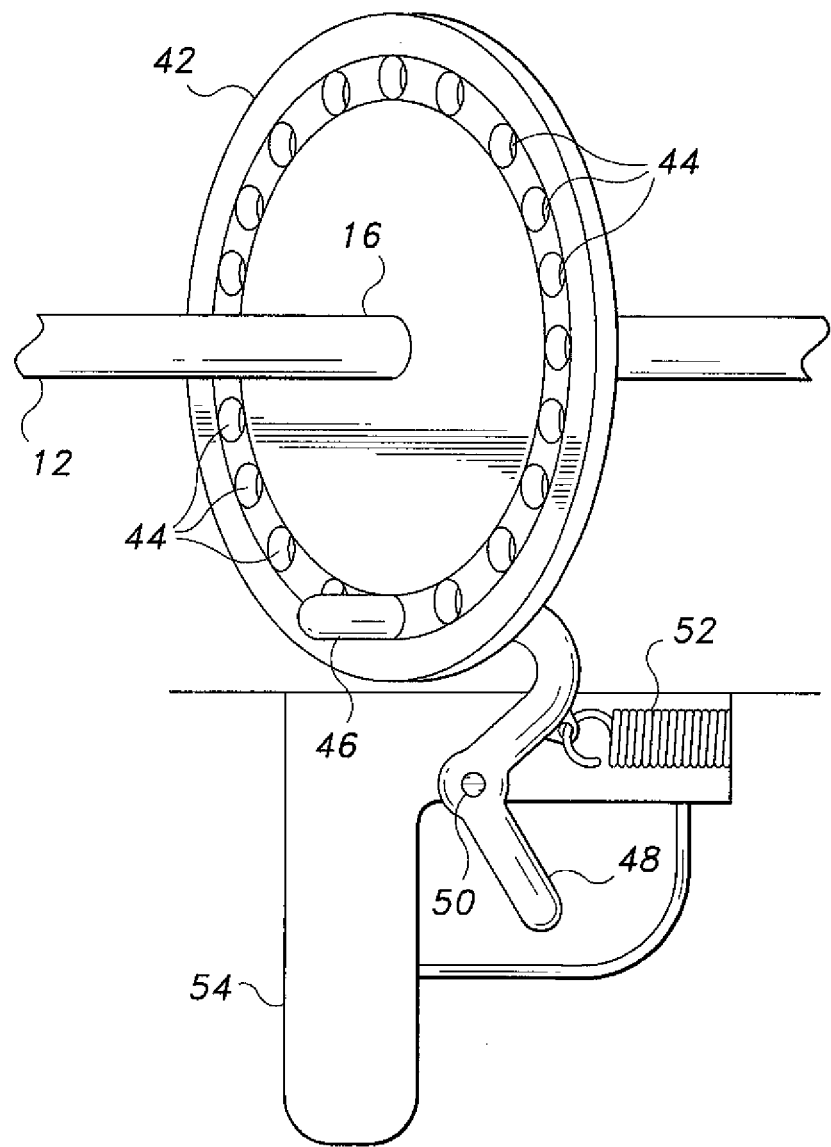
FIG. 5 is a detailed partial perspective view of the safety mechanism of the multiple shot spear gun of FIG. 1, illustrating further details thereof Similar reference characters denote corresponding features consistently throughout the attached drawings.

A housing 22 is installed at the rearward end of the spear gun 10. The rearward end 18 of the rotary shaft 12 rotates within the housing 22. The housing 22 serves as a mounting point for the rearward ends of a plurality of spear gun barrels 24. The opposite forward ends of the barrels 24 are affixed to the periphery of the barrel retainer disc 20, e.g., in notches 26 formed in the periphery of the barrel retainer disc 20. Thus, the rotary central shaft 12 rotates concentrically within the relatively stationary array of spear gun barrels 24 and the retainer disc 20 and housing 22 to which the barrels 24 are affixed. Any practicable number of spear gun barrels 24 may be used to form the multiple shot spear gun 10. The number of barrels 24 shown in FIG. 1 is indeterminate, due to the perspective of the drawing. However, FIG. 2 shows the forward ends of eight spear gun barrels 24. FIGS. 3 and 5 show only three such barrels, but those FIGS. 3 and 5 have been simplified to illustrate specific mechanisms, as described further below. The spear gun barrels are preferably arranged to form a generally cylindrical array due to the circular forms of the barrel retainer disc 20 and the housing 22. However, it will be seen that other configurations may be formed, if desired.

FIG. 3 of the drawings illustrates the firing (or release or launch) mechanism utilized to fire or launch spears 28 (the forward ends of which are illustrated in FIG. 1) from the spear gun barrels 24. This assembly would normally be concealed by the housing 22 (shown in FIG. 1), but the housing is removed in FIG. 3 of the drawings for clarity. Each of the spear gun barrels 24 includes a trigger mechanism 30 at its rearward end, a trigger 32 being shown extending from the rearward end of each barrel 24. The trigger mechanisms are conventional, and need not be described further. The barrels 24 are oriented about the central shaft 12 such that their triggers 32 extend radially inward toward the shaft 12.

A rotary actuator disc 34 is affixed on the rearward end 18 of the rotary shaft 12, and rotates in unison therewith. The actuator disc 34 is disposed immediately forward (or alternatively, immediately rearward) of a plane defined by the spear gun triggers 32, and includes a sloped trigger actuating tang 36 on the rearward (or alternatively, forward) face of the disc 34, i.e., the face oriented toward and immediately adjacent the triggers 32. The tang 36 has an elevation sufficient to impinge on the triggers 32, thereby displacing the triggers 32 to fire the spear gun 10 as the actuator disc 34 rotates.

A rotary knob 38 or the like extends from the housing 22, enabling the user of the multiple shot spear gun 10 to rotate the actuator disc 34 to launch the spears in sequence. In the embodiment of FIGS. 1 and 3, the knob 38 is affixed concentrically to a rearward extension of the central rotary shaft 12 and rotates in unison therewith. Thus, rotation of the knob 38 in a clockwise direction (as viewed in FIG. 3 and indicated by the directional arrow in the drawing) causes the actuator disc 36 to rotate, the tang 36 sequentially rotating beneath each of the triggers 32 to displace the triggers and launch the corresponding spear.

Figure 4:
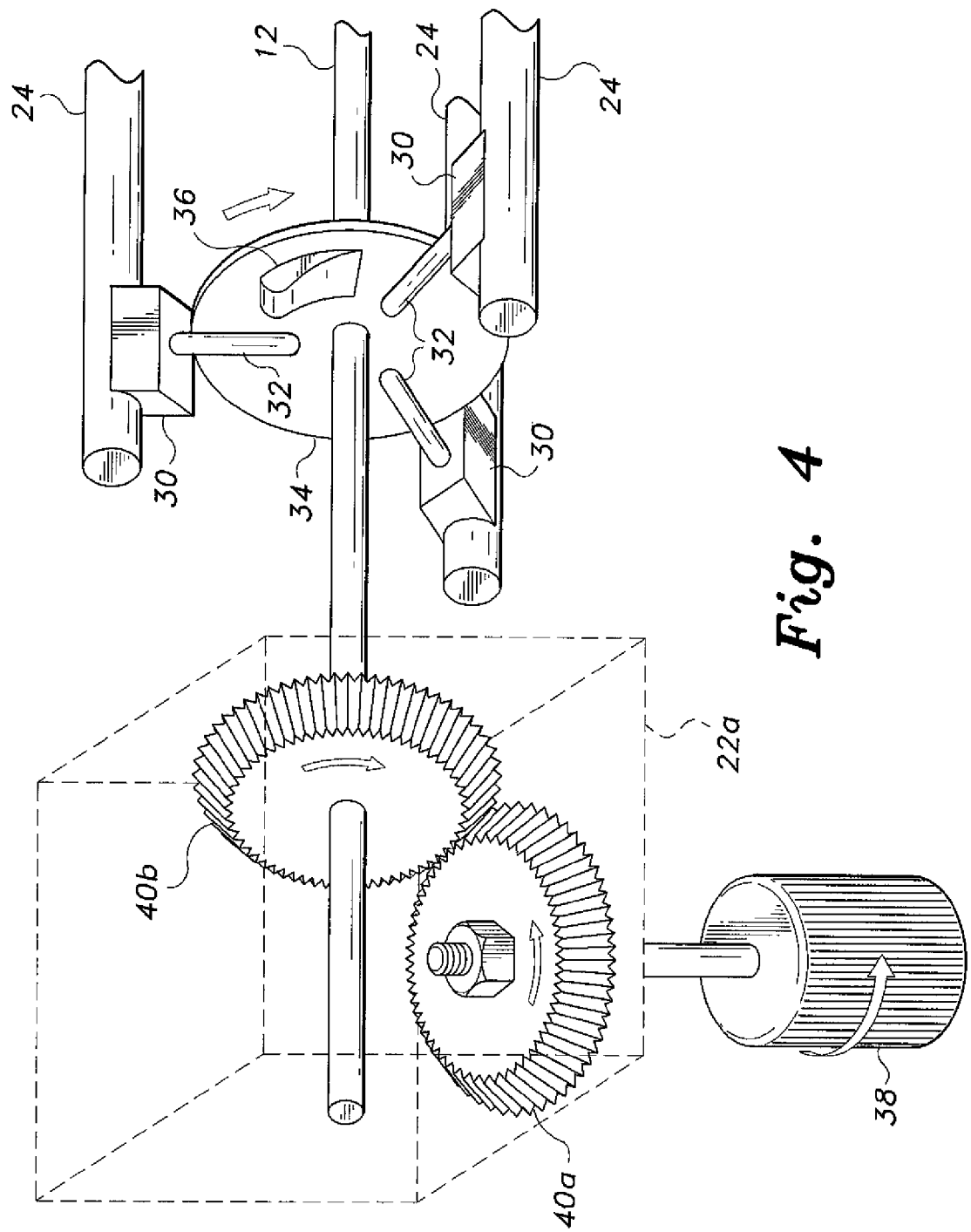
FIG. 4 is detailed partial perspective view of a second embodiment of a rotary firing mechanism of the multiple shot spear gun according to the present invention, illustrating further details thereof.

FIG. 4 of the drawings provides an illustration of an alternative means of rotating the actuator disc 34. It will be seen in FIG. 4 that the various components comprising the firing or launching mechanism, i.e., the spear gun trigger mechanisms 30, their triggers 32, the actuator disc 34, and the tang 36, are substantially identical to those components illustrated in FIG. 3 and described above. However, it will be seen that the rotary knob 38 extends laterally from the alternative rectangular housing 22a (shown in broken lines in FIG. 4, to more clearly illustrate the internal components), rather than extending concentrically therefrom, as in FIGS. 1 and 3. In the embodiment of FIG. 4, the rotary knob 38 drives a gear train comprising first and second bevel gears 40a and 40b within the housing 22a. The rotary knob 38 is affixed to the first bevel gear 40a by a concentric shaft extending laterally from the housing 22a. The first bevel gear 40a meshes with a second bevel gear 40b. The second bevel gear 40b is affixed concentrically to the rearward extension of the central shaft 24, and is driven by rotation of the first bevel gear 40a. Thus, rotation of the rotary knob 38 causes the shaft 24 and its actuator disc 34 to rotate, thereby tripping the triggers 32 of the spear gun 10 as the tang 36 rotates against the triggers 32, in substantially the same manner as described above for the concentric knob embodiment of FIG. 3.

FIG. 5 of the drawings illustrates an automatic safety mechanism for the multiple shot spear gun 10. The safety mechanism automatically engages after each shot to preclude the firing of more than one shot at a time before release of the safety. A rotary safety disc 42 is affixed to the medial portion 16 of the central rotary shaft 12, and rotates with the shaft 12 as the shaft 12 rotates. The safety disc 42 includes a plurality of holes 44 in a circular array near the periphery of the disc 42. The holes 44 accept a safety latch 46 that precludes rotation of the disc 42 when engaged with one of the holes 44. A safety release lever 48 extends from the safety latch 46. The latch 46 and the release lever 48 are mounted on a pivot 50 therebetween. The safety latch 46 is urged toward the safety disc 42 and its holes 44 by a compression spring 52 bearing against the latch arm above the pivot 50.

Thus, the operator must first pull on the safety release lever 48 to withdraw the safety latch 46 from the hole 44 in which it has seated before being able to rotate the knob 38 (FIG. 1, 3, or 4) to launch one of the spears 28 (FIG. 1). When the operator of the multiple shot spear gun 10 then rotates the knob 38 to launch one of the spears 28, the rotation of the central shaft 12 will also rotate the safety disc 42, thus causing the next hole 44 in the disc to rotate beneath the safety latch 46. The safety latch 46 is pushed into the hole 44 by the compression spring 52, thereby stopping further rotation of the safety disc 42, central shaft 12, and the actuator disc 34 of the launching mechanism (FIGS. 3 and 4) to preclude the launching of a subsequent spear until the safety latch 46 is again released by means of the safety release lever 48. A hand grip 54 may be provided on the structure, e.g., mounted upon one of the spear gun barrels 24, to facilitate the manipulation of the safety release lever 48.

While the safety mechanism and its safety disc 42 described above is described as being a separate component from the launch mechanism and its actuator disc 34, it will be seen that both discs 34 and 42 are affixed to the central rotary shaft 12 and rotate therewith. Accordingly, the two discs 34 and 42 may be combined into a single component having both the tang 36 of the actuator disc 34 and the holes 44 of the safety disc 42. Such a combination disc may be installed at the location of the actuator disc 34 illustrated in FIGS. 3 and 4, with the safety release mechanism mounted to the housing 22 (FIG. 1) or 22a (FIG. 4).

It is to be understood that the present invention is not limited to the embodiments described above, but encompasses any and all embodiments within the scope of the following claims.

I claim:

1. A multiple shot spear gun, comprising:
   an elongate central rotary shaft having a forward end, a medial portion, and a rearward end;
   a stationary barrel retainer disc disposed at the forward end of the shaft, the forward end of the shaft rotating within the stationary disc;
   a stationary housing disposed at the rearward end of the shaft, the rearward end of the shaft rotating within the stationary housing; and
   a plurality of spear gun barrels attached to the housing and the barrel retainer disc and extending therebetween, the barrels being disposed in a generally cylindrical array, the shaft rotating concentrically within the barrel array, the barrels being adapted for loading a spear therein.

2. The multiple shot spear gun according to claim 1, further comprising:
   a corresponding trigger mechanism attached to each of the barrels, respectively, in the housing;
   a trigger actuator disposed within the housing and mounted for rotation with said central rotary shaft, the trigger actuator contacting the trigger mechanisms to actuate the trigger mechanisms on each of the barrels one at a time in sequence when said central shaft is rotated; and
   a rotary knob extending from the housing, the rotary knob being connected to said central rotary shaft, wherein rotation of the knob rotates said central rotary shaft to actuate the trigger mechanisms.

3. The multiple shot spear gun according to claim 2, wherein the rotary knob is affixed directly to and concentric with said central rotary shaft.

4. The multiple shot spear gun according to claim 2, further comprising a gear train disposed between said central rotary shaft and the rotary knob, the rotary knob extending laterally from the housing.

5. The multiple shot spear gun according to claim 2, wherein the trigger actuator comprises:
   a rotary actuator disc disposed within the housing, the actuator disc being affixed to said central rotary shaft for rotation therewith; and
   a trigger actuating tang disposed upon the disc, the tang contacting and sequentially actuating the corresponding trigger mechanism on each of the barrels in turn when the rotary knob and the actuator disc are rotated.

6. The multiple shot spear gun according to claim 1, further comprising an automatically actuated safety mechanism disposed upon the medial portion of said central rotary shaft.

7. The multiple shot spear gun according to claim 6, wherein the safety mechanism further comprises:
   a rotary safety disc affixed to the medial portion of said central rotary shaft, the safety disc having a plurality of holes defined therein disposed in a circular array;
   a safety pin selectively engaging each of the holes of the safety disc in sequence as the safety disc is rotated;
   a bias spring urging the safety pin into engagement with the holes of the safety disc; and
   a safety release lever extending from the safety pin.

8. A multiple shot spear gun, comprising:
   an elongate central rotary shaft having a forward end, a medial portion, and a rearward end;
   a stationary barrel retainer disc disposed at the forward end of the shaft, the forward end of the shaft rotating within the stationary disc;
   a stationary housing disposed at the rearward end of the shaft, the rearward end of the shaft rotating within the stationary housing;
   a plurality of spear gun barrels attached to the housing and the barrel retainer disc and extending therebetween, the shaft rotating concentrically within the barrel array;
   a corresponding trigger mechanism attached to each of the barrels, respectively, in the housing;
   a trigger actuator disposed within the housing and mounted for rotation with the central rotary shaft, the trigger actuator contacting the trigger mechanisms to actuate the trigger mechanisms on each of the barrels one at a time in sequence when the central shaft is rotated; and
   a rotary knob extending from the housing, the rotary knob being connected to the central rotary shaft, wherein rotation of the knob rotates the central rotary shaft to actuate the trigger mechanisms.

9. The multiple shot spear gun according to claim 8, wherein the spear gun barrels are disposed in a generally cylindrical array.

10. The multiple shot spear gun according to claim 8, wherein the rotary knob is affixed directly to and concentric with said central rotary shaft.

11. The multiple shot spear gun according to claim 8, further comprising a gear train disposed between said central rotary shaft and the rotary knob, the rotary knob extending laterally from the housing.

12. The multiple shot spear gun according to claim 8, wherein the trigger actuator comprises:
   a rotary actuator disc disposed within the housing, the actuator disc being affixed to said central rotary shaft for rotation therewith; and
   a trigger actuating tang disposed upon the disc, the tang contacting and sequentially actuating the corresponding trigger mechanism on each of the barrels in turn when the rotary knob and the actuator disc are rotated.

13. The multiple shot spear gun according to claim 8, further comprising an automatically actuated safety mechanism disposed upon the medial portion of said central rotary shaft.

14. The multiple shot spear gun according to claim 13, wherein the safety mechanism further comprises:
   a rotary safety disc affixed to the medial portion of said central rotary shaft, the safety disc having a plurality of holes defined therein disposed in a circular array;
   a safety pin selectively engaging each of the holes of the safety disc in sequence as the safety disc is rotated;
   a bias spring urging the safety pin into engagement with the holes of the safety disc; and
   a safety release lever extending from the safety pin.

15. A multiple shot spear gun, comprising:
   an elongate central rotary shaft having a forward end, a medial portion, and a rearward end;
   a stationary barrel retainer disc disposed at the forward end of the shaft, the forward end of the shaft rotating within the stationary disc;
   a stationary housing disposed at the rearward end of the shaft, the rearward end of the shaft rotating within the stationary housing;
   a plurality of spear gun barrels attached to the housing and the barrel retainer disc and extending therebetween, the barrels being disposed in a generally cylindrical array, the shaft rotating concentrically within the barrel array, the barrels being adapted for loading a spear therein; and
   an automatically actuated safety mechanism disposed upon the medial portion of the shaft.

16. The multiple shot spear gun according to claim 15, wherein the safety mechanism further comprises:
   a rotary safety disc affixed to the medial portion of said central rotary shaft, the safety disc having a plurality of holes defined therein disposed in a circular array;
   a safety pin selectively engaging each of the holes of the safety disc in sequence as the safety disc is rotated;
   a bias spring urging the safety pin into engagement with the holes of the safety disc; and
   a safety release lever extending from the safety pin.

17. The multiple shot spear gun according to claim 15, further comprising:
   a corresponding trigger mechanism attached to each of the barrels, respectively, in the housing;
   a trigger actuator disposed within the housing and mounted for rotation with said central rotary shaft, the trigger actuator contacting the trigger mechanisms to actuate the trigger mechanisms on each of the barrels one at a time in sequence when said central shaft is rotated; and
   a rotary knob extending from the housing, the rotary knob being connected to said central rotary shaft, wherein rotation of the knob rotates said central rotary shaft to actuate the trigger mechanisms.

18. The multiple shot spear gun according to claim 17, wherein the rotary knob is affixed directly to and concentric with said central rotary shaft.

19. The multiple shot spear gun according to claim 17 further comprising a gear train disposed between said central rotary shaft and the rotary knob, the rotary knob extending laterally from the housing.

20. The multiple shot spear gun according to claim 17, wherein the trigger actuator comprises:
   a rotary actuator disc disposed within the housing, the actuator disc being affixed to said central rotary shaft for rotation therewith; and
   a trigger actuating tang disposed upon the disc, the tang contacting and sequentially actuating the corresponding trigger mechanism on each of the barrels in turn when the rotary knob and the actuator disc are rotated.

\* \* \* \* \*